Aug. 30, 1960 D. D. JOHNSON 2,950,990

METHOD FOR APPLYING A UNIFORM COATING TO A CYLINDRICAL BODY

Filed April 8, 1957

INVENTOR.
DONALD D. JOHNSON

BY Edward A. Robinson

ATTORNEY

United States Patent Office 2,950,990
Patented Aug. 30, 1960

2,950,990

METHOD FOR APPLYING A UNIFORM COATING TO A CYLINDRICAL BODY

Donald D. Johnson, Los Gatos, Calif., assignor to International Business Machines Corporation, New York, N.Y., a corporation of New York Filed Apr. 8, 1957, Ser. No. 651,447

8 Claims. (Cl. 117—94)

Figure 1:
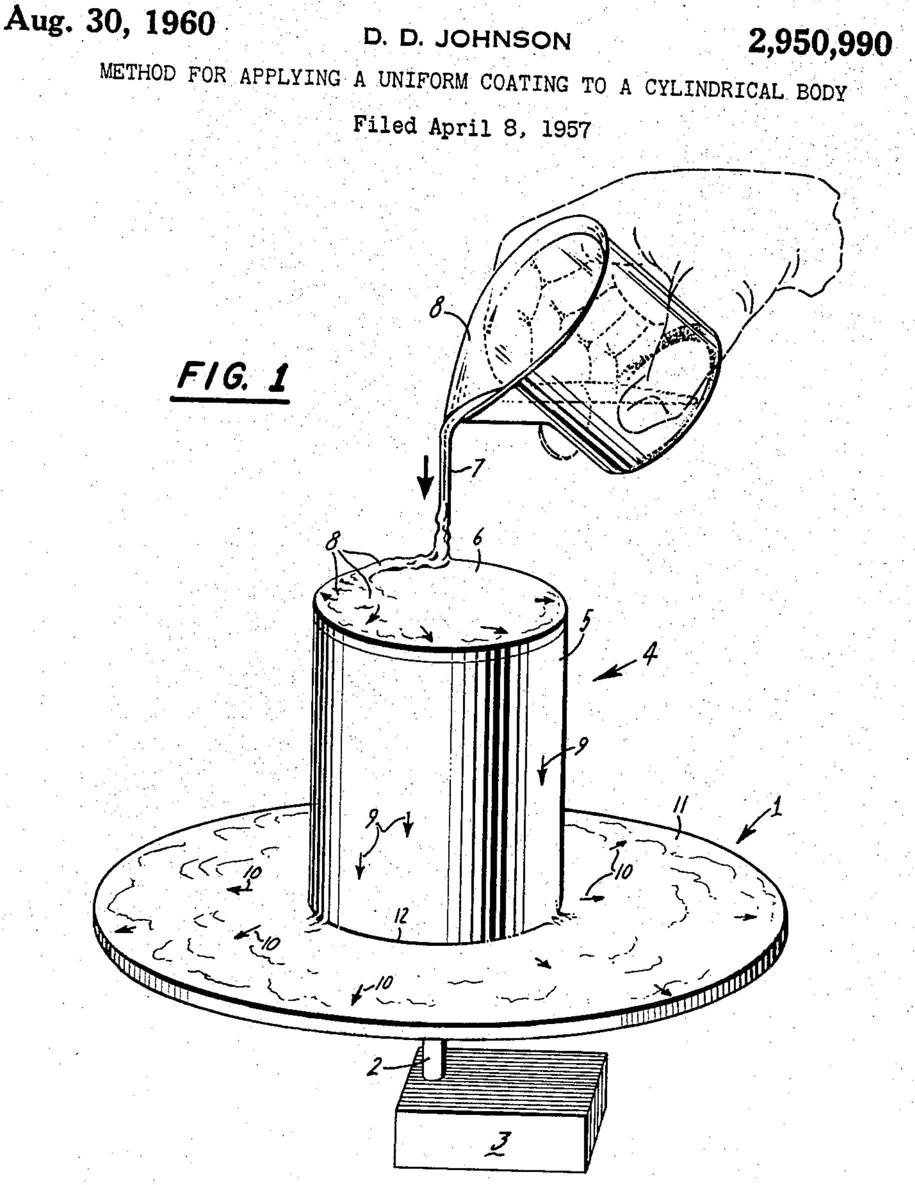

This invention relates to methods and means for coating bodies and, more particularly, to a process for applying a thin uniform coating to the lateral surface of a cylinder.

In the magnetic recording art, frequent use is made of rotating drums carrying magnetizable coatings on their lateral surfaces. Frequently, such coatings are provided by electroplating a thin cobalt-nickel layer. This electroplating process is relatively costly; and the drums so coated may have occasional voids which cannot be tolerated, thereby causing a high percentage of rejects or discarded drums. Further developments have shown that a magnetizable material, such as iron oxide or another ferrite compound, may be suspended in a liquid, such as lacquer or an epoxy resin, which may be applied to a surface and permitted to harden thereon. The resulting surface has been found quite practical for magnetic recording.

It is an object of this invention to provide an improved method for coating a surface of a body with a fluid material which may later harden; it is a further object that this method of coating shall be relatively simple and inexpensive and shall produce a very uniform surface free from voids.

Another object of this invention is to provide a drum or other body having a cylindrical surface which will be suitable for use as a memory file in an electronic computer; more particularly, it is an object to provide a cylindrical surface with a thin uniform coating of magnetizable material by applying the coating as a liquid, stretching the liquid thereon, and permitting the liquid to harden.

Briefly stated, in a preferred form of this invention, a drum or other body which may have a cylindrical surface is positioned upon a turntable and rotated. Liquid material is poured onto the body such that it will run downwardly over the cylindrical surface to the turntable surface. An excess of material which arrives at the turntable surface is urged outwardly thereon by centrifugal force. The cylindrical surface of the body and the flat surface of the turntable are arranged to be contiguous or touching such that the surface of the turntable provides an outward extension of the cylindrical surface. By control of the rotational speed of the turntable and the body thereon, the liquid covering the cylindrical surface and flowing outwardly on the turntable remains unbroken; and the force of surface tension inherent in the liquid pulls the liquid on the cylindrical surface downwardly as the excess liquid on the flat surface of the turntable is drawn outwardly by centrifugal force. In the resulting coaction between the force of surface tension in the liquid and the centrifugal force from rotation of the turntable, the liquid remaining upon the cylindrical surface is drawn tight and stretched into a thin unbroken film.

Other objects of the invention will be pointed out in the following description and claims and illustrated in the accompanying drawings which disclose, by way of example, the principle of the invention and the best mode which has been contemplated of applying that principle.

Figure 2:
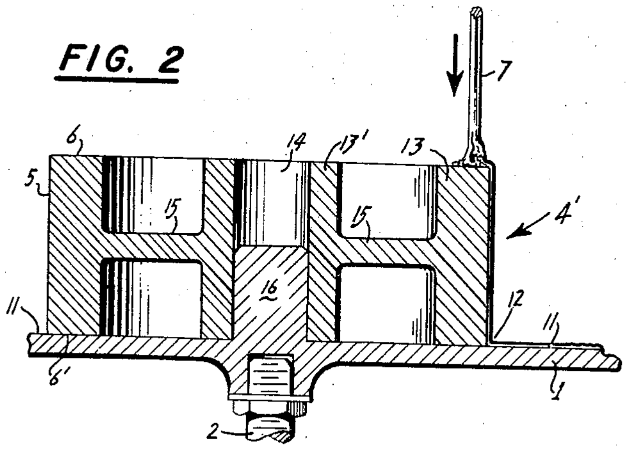

In the drawings:

Fig. 1 is a perspective view of a turntable with a cylindrical body thereon and illustrating a means for applying a liquid coating material to the body; and Fig. 2 is a vertical section of a turntable with a specific type of a magnetic drum intended to be used as a memory file of an electronic computer.

The basic elements for practicing this invention are shown in Fig. 1. A horizontal turntable 1 is mounted to rotate with a vertical shaft 2 which is turned by a drive means schematically illustraed by the box 3. The drive means may be of any conventional sort such as a controllable speed motor having reducing gears to turn the shaft 2 at a controlled speed. A body 4 is illustrated as a regular cylinder having a cylindrical surface 5 and flat or planar end surfaces 6 and 6' of which only the upper surface 6 is shown in Fig. 1. The body 4 is positioned to rest upon and to rotate with the turntable 1. The body is positioned such that its axis of revolution coincides with the vertical axis of revolution of the turntable and the shaft 2, and it is unnecessary to provide further supporting or clamp means since with this centered positioning there will be no net centrifugal force tending to throw the body from the turntable.

While the turntable 1 and the body 4 thereon are rotating, a liquid coating material 7 is applied to the upper portion of the cylindrical surface 5 of the body 4. As illustrated in Fig. 1, this may be accomplished by simply pouring the material 7 from a convenient receptacle, such as the beaker 8, onto an outer part of the top surface 6 of the body 4. The material thus received on the top surface 6 will flow outwardly by centrifugal force to the upper end of the cylindrical surface 5, as indicated by arrows 8, and will thence flow downwardly, as indicated by arrows 9, to the turntable 1 covering the entire peripheral cylindrical surface 5. With the cylindrical surface 5 covered with material, an excess of the material will tend to collect on the turntable 1 whereupon it will flow outwardly, as indicated by arrows 10, due to the centrifugal force developed by rotation of the turntable 1.

The cylindrical body 4 has a flat undersurface 6' which rests upon the flat supporting surface 11 of the turntable 1, and the cylindrical surface 5 is contiguous with the supporting surface 11 since the surfaces 5 and 11 have an unbroken line of intersection 12 which is a circle across which the material 7 may flow without interruption. It will therefore be appreciated that when the body 4 rests upon the turntable 1, the outer portion of the supporting surface 11 is an extension of the cylindrical surface 5 for passing the liquid material.

Since the flow of material 7 is uninterrupted from the surface 5 across the intersection 12 to the surface 11, a force of surface tension which is inherent in all liquids will tend to hold the liquid together as a single fluid mass. If the rotational speed of the turntable is controlled such that the force of surface tension is not overcome, then the centrifugal force experienced by the excess material flowing outwardly on the surface 11 will be conveyed to that material remaining on the cylindrical surface 5. The liquid on the cylindrical surface 5 will thus be drawn downwardly in part by the force of gravity but principally by the inherent force of surface tension. After the cylindrical surface 5 has been completely covered by material 7, the pouring from the receptacle 8 is terminated, whereupon the material remaining on the body 4 will be stretched into a thin film by the surface tension force and with only a thin film of material covering the surface 5 held by a wetting or adhesive force inherent in liquids.

Ordinarily when a liquid flows along on a surface, it will form in "runs" or downwardly extending paths of increased depth or thickness which would result in an uneven coating. In the practice of this invention, the rotation of the cylinder 4 results in a relative movement of air across the surface 5 in a direction which is circumferential with respect to the cylindrical surface 5 and which is transverse to the downward direction of the runs of material. The air will exert a shearing force upon the material 7 and will tend to smooth out the runs.

By controlling the speed of the drive means 3 and by controlling the viscosity, this material can be stretched into an extremely thin film which is uniform in thickness and free from voids. The centrifugal force causing the liquid to flow outwardly on the surface 11 is directly proportional to the rotational speed of the turntable 1. This centrifugal force should not be strong enough to overcome the surface tension force of the liquid at the junction 12 between the surfaces 5 and 11 since the fluid mass should remain unbroken as the material flows downwardly and outwardly. An optimum rotational speed for the turntable is the maximum speed possible without overcoming the surface tension force and separating the material on or near the cylindrical surface 5. It has been found that a cylindrical drum six inches in diameter can be satisfactorily coated using a turntable rotational speed of approximately 100 r.p.m.

In one preferred form of this invention, the liquid material was poured onto the upper end surface 6 while the body 4' was rotating slowly, and upon completion of the pouring step, a ring of liquid material was resting on the top surface 6. Thence the rotational speed was increased causing the ring of material to expand and flow over the cylindrical surface 5 and downwardly thereon to the turntable 1. When the rotational speed approached the optimum speed as indicated in the foregoing paragraph, the material remaining on the cylindrical surface was stretched to the desired uniform thickness.

A final step in the coating of the drum's surface is to permit the material 7 to dry or harden. This may be done after the rotation has stopped and the drum has been removed from the turntable. In a preferred form of this invention, the liquid material or vehicle may be a thermalsetting plastic such as an epoxy resin. In this case, the material must be heated to accomplish the setting or hardening thereof. Thus as a final step in coating a body, the body having the thin liquid coating thereon may be baked in an oven to permanently set and harden the coating.

In Fig. 2, a body 4' is a cylinder of the type used in an electronic computer as a memory file. As illustrated, the drum comprises an outer or rim part 13 which provides the cylindrical working surface 5 forming the outer periphery. A hub part 13' contains a shaft opening 14 for mounting the drum file on a rotatable shaft (not shown) in a computing machine. A relatively thin web 15 connects between the hub 13' and the rim 13 such that the drum will be of less weight than if it were a solid cylinder. The turntable 1, shown in Fig. 2, may be further provided with an upwardly extending hub or spindle 16 which may be useful in centering the body 4' in a rotational position on the turntable. Thus, if it is desired to mass produce the magnetic drum files, little time would be lost in centering each drum upon the turntable.

It may be appreciated that the cylindrical surface 5 of the drum 4' in Fig. 2 extends downwardly to a circular line of intersection with the supporting surface 11 of the turntable 1 such that the cylindrical surface 5 and the supporting surface 11 are contiguous, and the surface 11 forms an outward extension from the surface 5. As in Fig. 1, the liquid material 7 is illustrated as being initially poured onto the upper end surface 6 of the body 4', whereupon it will move outwardly to the cylindrical surface 5 by centrifugal force, although the material could be initially applied to the surface 5 by other methods such as direct spraying thereon or by simple immersion of the drum in a bath prior to positioning it on the turntable.

This invention has been shown and described in connection with the coating of a cylindrical drum for a magnetic recording and memory file of an electronic computer, but it may be appreciated that a thin coating of material may be applied to any regularly shaped body for any purpose by utilizing the teachings of this invention.

While there have been shown and described and pointed out the fundamental novel features of the invention as applied to the preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A method for coating a cylindrical surface of a body having an axis of revolution, said method comprising applying a liquid coating material to a first end of the body, permitting the material to flow across the cylindrical surface to the second end of the body, rotating the body about the axis thereof, conducting an excess of the material from the second end, and drawing the material remaining on the cylindrical surface into a thin film by surface tension.

2. A method for coating a cylindrical surface of a body, said method comprising positioning the body on a turntable, rotating the turntable and body thereon, applying liquid coating material to an upper end of the cylindrical surface, allowing the material to flow downwardly by gravity across the cylindrical surface, removing an excess of the material from the lower end of the cylindrical surface, and stretching the liquid material on the cylindrical surface into a thin film by utilizing surface tension thereof.

3. A method for coating a cylindrical surface of a body having an axis of revolution, said method comprising positioning the body on a turntable with the axis of the body aligned with the axis of the turntable, applying a liquid coating material to the upper end of the cylindrical surface, allowing the material to flow downwardly across the cylindrical surface, rotating the turntable and the body about the aligned axes and thereby producing a centrifugal force to cause an excess of the material to flow outwardly on the turntable from the cylindrical surface, and stretching the material on the cylindrical surface into a thin film held together by surface tension of the material.

4. A method for coating a cylindrical peripheral surface of a body having an axis of revolution, said method comprising centering the body on a turntable of greater diameter than the diameter of the cylindrical surface of the body, rotating the turntable and the body thereon, pouring a liquid coating material onto an upper surface of the body, allowing the material to flow outwardly by centrifugal force to the peripheral cylindrical surface of the body and thence to flow downwardly by gravity covering the cylindrical surface, allowing an excess of the material to flow outwardly on the turntable from the cylindrical surface by centrifugal force, and stretching the material remaining on the cylindrical surface of the body into a thin film by virtue of surface tension of the material resisting the centrifugal force drawing the material outwardly on the turntable.

5. A method for coating a cylindrical peripheral surface of a body having opposed spaced flat end surfaces and having an axis of revolution therethrough, said method comprising positioning the body on a turntable with the axis of the body extending vertically and aligned with the rotational axis of the turntable, providing the turntable with a flat surface for supportably engaging one of the end surfaces of the body such that the surface of the turntable is contiguous with the lower end of the cylindrical surface, providing the turntable with further surface extending outwardly from the cylindrical surface, rotating the turntable and the body thereon, pouring a liquid coating material onto the upper end surface of the cylinder, allowing the material to flow outwardly by centrifugal force to the top of the peripheral cylindrical surface, allowing the material to flow downwardly by gravity over the cylindrical surface to the turntable, allowing an excess of the material to flow outwardly by centrifugal force from the cylindrical surface on the outwardly extending surface of the turntable, and stretching the material on the cylindrical surface into a thin film by allowing the centrifugal force of the excess material on the turntable to combine with surface tension force of the material flowing from the cylindrical surface of the body.

6. A method for coating a cylindrical peripheral surface of a body having opposed spaced flat end surfaces and having an axis of revolution therethrough, said method comprising positioning the body on a turntable with the axis of the body extending vertically and aligned with the rotational axis of the turntable, providing the turntable with a flat surface for supportably engaging one of the end surfaces of the body such that the surface of the turntable is contiguous with the lower end of the cylindrical surface, providing the turntable with further surface extending outwardly from the cylindrical surface, rotating the turntable and the body thereon, pouring a liquid coating material onto the upper end surface of the cylinder, allowing the material to flow outwardly by centrifugal force to the top of the peripheral cylindrical surface, allowing the material to flow downwardly by gravity over the cylindrical surface to the turntable, allowing an excess of the material to flow outwardly by centrifugal force from the cylindrical surface on the outwardly extending surface of the turntable, stretching the material on the cylindrical surface into a thin film by allowing the centrifugal force of the excess material on the turntable to combine with surface tension force of the material flowing from the cylindrical surface of the body, and permitting the material to harden into a solid film on the cylindrical surface.

7. The method for coating a cylindrical surface according to claim 6 wherein the coating material contains a thermal-setting plastic, and wherein the material is hardened by applying heat thereto.

8. A method for coating a cylindrical peripheral surface of a body having opposed spaced flat end surfaces and having an axis of revolution therethrough, said method comprising positioning the body on a turntable with the axis of the body extending vertically and aligned with the rotational axis of the turntable, providing the turntable with a surface for supportably engaging one of the end surfaces of the body such that the surface of the turntable is contiguous with the lower end of the cylindrical surface, providing the turntable with continuing surface extending outwardly from the cylindrical surface of the body resting thereon, rotating the turntable slowly while pouring a liquid coating material onto the upper end surface of the cylinder to form a ring thereon, increasing the rotational speed of the turntable to expand the ring of material by centrifugal force and to cause the material to flow outwardly to and thence downwardly covering the cylindrical surface, and further increasing the rotational speed to an optimum whereupon centrifugal force exerted upon the material on the outwardly extending surface of the turntable coacts with surface tension inherent in the material to stretch the material covering the cylindrical surface into a thin film.

References Cited in the file of this patent

UNITED STATES PATENTS

| | | |
|---|---|---|
| 1,343,887 | Slocum | June 15, 1920 |
| 2,539,410 | Essig | Jan. 30, 1951 |
| 2,636,471 | Starkey | Apr. 28, 1953 |